United States Patent [19]

Drexler et al.

[11] Patent Number: 5,559,885
[45] Date of Patent: Sep. 24, 1996

[54] TWO STAGE READ-WRITE METHOD FOR TRANSACTION CARDS

[75] Inventors: Jerome Drexler, Los Altos Hills; Christopher J. Dyball, Half Moon Bay, both of Calif.

[73] Assignee: Drexler Technology Corporation, Mountain View, Calif.

[21] Appl. No.: 200,779

[22] Filed: Feb. 22, 1994

Related U.S. Application Data

[63] Continuation-in-part of Ser. No. 181,697, Jan. 14, 1994.

[51] Int. Cl.$^6$ ........................................ G06F 7/08
[52] U.S. Cl. ........................... 380/23; 235/379; 235/380; 235/381
[58] Field of Search ........................... 380/23; 235/379, 235/380, 381

[56] References Cited

U.S. PATENT DOCUMENTS

| | | | |
|---|---|---|---|
| 4,256,955 | 3/1981 | Giraud et al. | 235/380 |
| 4,360,728 | 11/1982 | Drexler | 235/462 |
| 4,467,209 | 8/1984 | Maurer et al. | 235/487 |
| 4,491,725 | 1/1985 | Pritchard | 235/375 |
| 4,629,874 | 12/1986 | Pugsley et al. | 235/380 |
| 4,683,371 | 7/1987 | Drexler | 235/487 |
| 4,683,372 | 7/1987 | Matsumoto | 235/380 X |
| 4,879,747 | 11/1989 | Leighton et al. | 380/23 |
| 4,937,436 | 6/1990 | Eglise et al. | 235/380 |
| 4,961,229 | 10/1990 | Takahashi | 381/42 |
| 4,993,068 | 2/1991 | Piosenka et al. | 380/23 |
| 4,995,081 | 2/1991 | Leighton et al. | 380/23 |
| 5,053,608 | 10/1991 | Senanayake | 235/380 |
| 5,259,025 | 11/1993 | Monroe et al. | 380/23 |
| 5,285,200 | 2/1994 | Kuriyama et al. | 235/380 X |
| 5,352,876 | 10/1994 | Watanabe et al. | 235/381 |

*Primary Examiner*—Gilberto Barron, Jr.
*Attorney, Agent, or Firm*—Schneck & McHugh

[57] ABSTRACT

A method for providing convenient, secure access to numerous benefits with a single wallet sized card having a high capacity data storage area, preferably an optical stripe, and a lower capacity magnetic storage stripe. The high capacity area is indelibly written with data denoting a set of entitlements and records of the owner of the card. To obtain use of the entitlements, the owner takes the card to a data conversion terminal and selects a set of entitlements from a menu displayed at the terminal and, provided that the selected set is a subset of the entitlements indelibly recorded on the high capacity area of the card, data is written on the magnetic stripe of the card authorizing use of the selected entitlements. The data written on the magnetic stripe can be used to obtain benefits at numerous existing and foreseeable magnetic stripe readers. If the selected set of entitlements is not a subset of those indelibly recorded, suggesting that the possessor of the card is not the owner of the card, such writing of data on the magnetic stripe is prevented, denying use of the card to obtain benefits.

16 Claims, 3 Drawing Sheets

TWO STAGE READ-WRITE METHOD FOR TRANSACTION CARDS

CROSS-REFERENCE TO RELATED APPLICATIONS

This application is a continuation-in-part of patent application Ser. No. 08/181,697 entitled "Anti-Fraud Verification System Using a Data Card", filed Jan. 14, 1994.

TECHNICAL FIELD

The present invention relates to data cards and in particular to a data card for dispensing benefits.

BACKGROUND ART

Plastic cards carrying magnetic stripes are widely used as credit cards, debit cards, automatic teller machine (ATM) cards, telephone payment cards, etc. It is believed that billions of these cards are used throughout the world.

Typically, these cards hold approximately 200 to 800 alphanumeric characters, which is the same as 200 to 800 bytes of data in computer language. The magnetic stripe is erasable and is read and written by a wide variety of commercial devices.

A variety of methods are used to enhance the security of such cards and to discourage fraudulent use. Holograms are affixed to the cards to make card counterfeiting more difficult. Color face photographs of the registered card owner are affixed to the card for confirmation that the possessor of the card is the rightful owner. Personal identification numbers (PIN) are memorized by the card owner and entered into terminals such as bank automatic teller machine (ATM) terminals to prove card ownership prior to cash payments to the card possessor.

In U.S. Pat. No. 4,683,371, Drexler teaches a dual strip card having both prerecorded data on a non-erasable strip and temporary data on a spaced apart, erasable strip.

In U.S. Pat. Nos. 4,879,747 and 4,995,081, Leighton et al. teach a method and system of encoding a password into a digital signature. The password may include a digitized photograph of the authorized cardholder which may be displayed at the transaction terminal.

U.S. Pat. No. 4,961,229 to Takahashi teaches a speech recognition system utilizing an IC card, and IC card reader, a microphone, and analyzer and a collating circuit, which are used together for identification of a person.

U.S. Pat. No. 4,993,068 to Piosenka et al. discloses a system for identifying users at remote access sites that encrypts physical characteristics of a user and stores the encrypted information in a computer, and then compares information received from a person requesting access at a remote site with that of the user to determine whether to allow access.

In U.S. Pat. No. 5,053,608, Senanayake discloses a personal identification system in which a user's fingerprint is recorded in encoded form permanently on an identification card and also temporarily in one of the secretly designated areas known only to the card holder and reader. This permanently encoded fingerprint is then compared with that of a fingerprint temporarily recorded at the time of use in one of the designated areas.

Finally, in U.S. Pat. No. 5,259,025, Monroe et al. teach a method of verifying the personal identity of an individual at a remote location by comparing video information received at the remote location with that previously recorded and stored at a central location.

In spite of all the anti-fraud methods currently used for obtaining credit, receiving cash, receiving miscellaneous benefits, etc., fraudulent use of magnetic stripe cards results in losses estimated at from many hundreds of millions of dollars to billions of dollars annually. The fraudulent methods involve a variety of techniques. Magnetic stripe cards are stolen. Lost cards are found and used. Cards are counterfeited. A person may apply for and have cards issued in the names of unsuspecting credit-worthy individuals. PIN numbers may be obtained by observing an ATM user entering his number or finding a PIN number noted in a lost or stolen wallet.

It is a current trend for welfare benefits to be paid out by electronic means. A number of states, including New Jersey, Maryland, and Minnesota, have adopted Electronic Benefit Transfer (EBT) programs, and many other states are considering EBT systems. The Health Security Act being proposed by the President and by some in Congress advocates the use of a plastic identification card which could evolve as a magnetic stripe card for health care providers to obtain payment from the health insurance alliances. Also, Vice President Al Gore's National Performance Review recently recommended adopting electronic systems for making government payments.

In the state of Minnesota, EBT programs are expected to include Aid to Families with Dependent Children (AFDC), General Assistance (GA), Family General Assistance (FGA), Work Readiness (WR), Emergency Assistance (EA), Emergency General Assistance (EGA), Minnesota Supplemental Aid (MSA), Emergency Minnesota Supplemental Aid (EMSA), Food Stamps and $50 Child Support Bonus. Minnesota is also studying potential applications for EBT technology that have been considered in other states or at the federal level, which include Social Security, Supplemental Security Income (SSI), Unemployment Benefits, Low Income Energy Assistance Program, Job Training Partnership Act, Worker's Compensation, State Employment Retirement Programs and Payroll Services. Other government services studied by Minnesota for future inclusion in systems related EBT Technology include drivers licenses, voter registration, cross country ski licenses, hunting/fishing/boating licenses, campsite reservations, motor vehicle registration renewals, jury selection, motor vehicle title information, auto insurance, law enforcement usage, donor blood/tissue type and benefit status for federal and state programs. It would be possible, but very expensive and cumbersome, for Minnesota to issue individual data cards for each of the applications and functions described herein.

SUMMARY OF THE INVENTION

The present invention offers individuals a single authorization card that can be used to provide the numerous individual entitlements, requirements and records currently and foreseeably available via electronic technology. To accomplish this, the card has a high capacity data storage area, such as is available with optical storage media or perhaps semiconductor integrated circuit memories, in order to store the potentially huge number of benefits, licenses, requirements, identification, ownership and medical information which would be desirable to keep with the individual in card form. Such optical storage technology is currently available but expensive. To make the information stored on the card more accessible and convenient, a second, lower capacity data storage area is provided on each card, the second area utilizing widely available and inexpensive magnetic storage technology. Since the lower capacity storage area can hold only a fraction of the data on the high capacity storage area, data conversion terminals (DCTs) are provided for downloading data from the high capacity area to the lower capacity area for use with ubiquitous and inexpensive magnetic card readers.

In the first storage area, an individual's rights, benefits, privileges, entitlements, licenses, personal health information, ownership records, government payments, other payments and the like are permanently recorded, along with personal identification and access data. The second area is used to write data authorizing limited use of the card to exercise rights, obtain benefits, entitlements, and privileges, provide information, and utilize licenses, government payments, other payments, and the like. The information recorded on the second area can be seen to denote a variable subset of the set of entitlements, requirements and the like recorded on the first area. This authorization data is written in the second area by a DCT, after analysis of the information stored on the first area of the card at the same DCT. For simplicity, all of the above-mentioned categories are defined herein as "entitlements" although it could be argued that some may be more appropriately labeled requirements or records. Thus, the data stored on the first area denotes a first set of entitlements, and the data stored on the second area denotes a second set of entitlements, the second set being a subset of the first set.

The first area is typically an optical stripe disposed on one side of the card, and the second area is typically a magnetic stripe which may be on the same side or opposite side of the card with respect to the first area. The side opposite the first area could support two magnetic stripes, each of which would have a width and location near the two edges of the long side of the card, consistent with established standards. It is also possible to have a magnetic stripe on the same side of the card as an optical stripe. Since the magnetic stripe has limited capacity, if the subset selected is large, the two or three stripe arrangement would be preferred.

The use authorized by the data stored on the second area at widely available entitlement dispensing terminals, such as EBT terminals, may be limited in time. Selection of certain elements comprising the entitlements may be limited in the degree or amount of entitlements, starting date of the entitlements, designation of family members who may use the card, or locations of the EBT terminals permitted to dispense the entitlements.

When the second area, such as a magnetic stripe, is to be authorized for use of a subset of entitlements, the card is inserted into the DCT which scans and reads the data stored in the optical stripe or semiconductor memory chip, seeking the subset selected by the card holder. The DCT requires the possessor of the card to select some entitlements from a menu or related procedure. The selected entitlements data is compared to that data previously stored on the card on the first area to determine if the card possessor is entitled to be authorized to use the selected entitlements. If this is confirmed in the DCT, the magnetic stripe is validated and authorized to provide the selected entitlements at EBT terminals for a given period of time, amount of use or other limit. Thus, the selection of entitlements from a menu adds a security feature, in that selecting entitlements stored on the card requires knowledge of the first set of entitlements. Repeated selection of incorrect entitlements can result in forfeiture of the card and activation of other system security features.

In addition, a validation or authorization code number and/or alphabet sequence can be modified based upon some information about the registered card owner. The modification could be based upon the name or other personal information. Thus, that authorization code sequence could not be used by someone else. This type of individualized authorization code thus would contain what is similar to a digital signature.

An advantage of the present invention is that it permits the installed base of magnetic stripe card equipment and systems to be used as is. Some or all of the magnetic stripe cards would be upgraded to a multiple application or function level, by replacing them with cards having a magnetic stripe and either an optical stripe or a semiconductor memory chip, which would not interfere with normal magnetic stripe transaction operation. Although more expensive than magnetic stripe EBT terminals, the number of DCT terminals could represent only about 1 to 30 percent of the number of magnetic stripe EBT terminals in use. They could be located in post offices, regional government buildings, shopping malls, selected supermarkets, and the like.

BEST MODE FOR CARRYING OUT THE INVENTION

Figure 1:
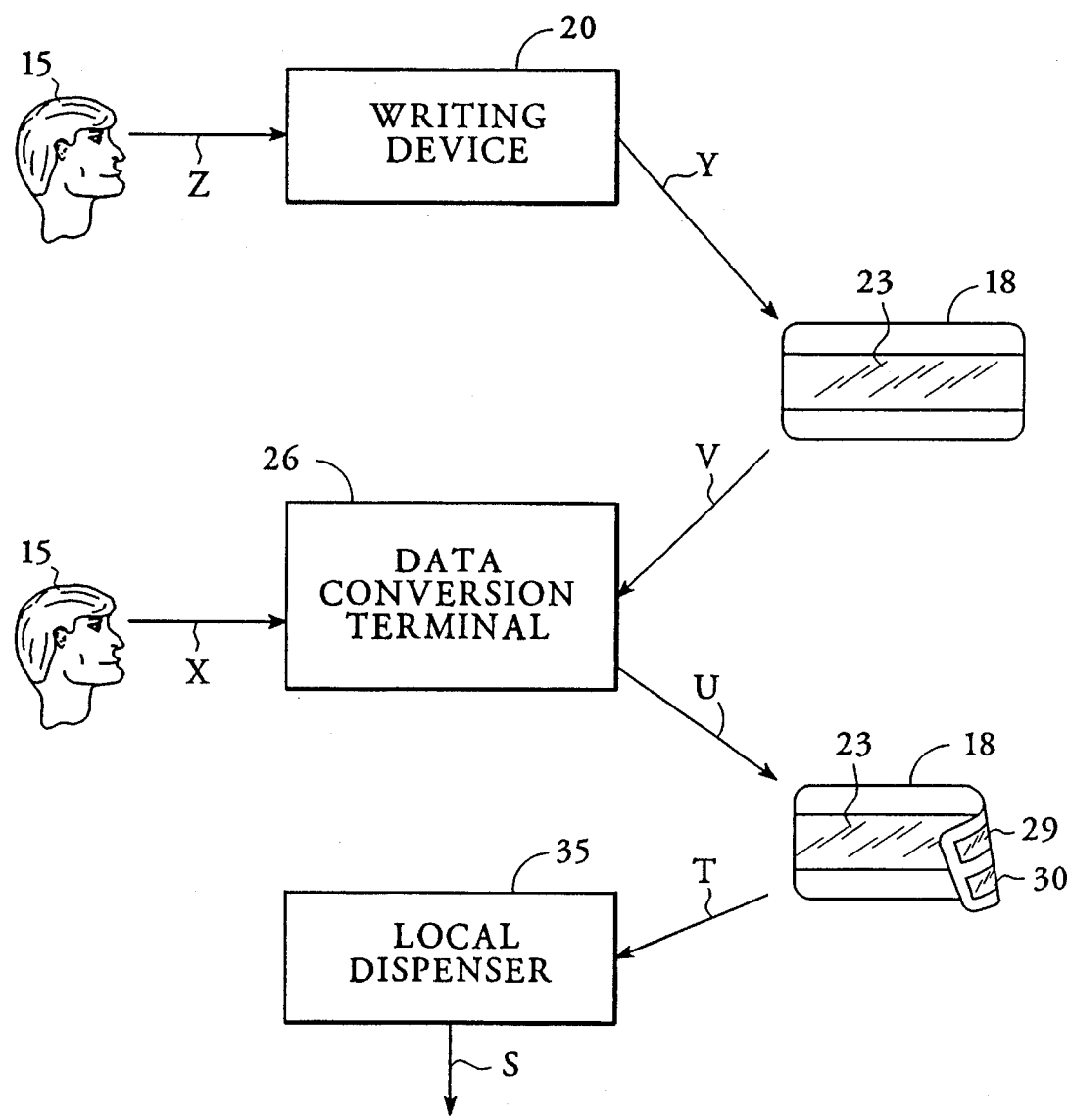
FIG. 1 is a diagram illustrating procedural steps in the system of the present invention.

Referring to FIG. 1, a person 15 begins by having data regarding an assortment of entitlements, records, responsibilities and identifying information recorded on a wallet-sized card 18. Some of that data may be provided by the person 15 as represented by arrow Z. The data is written onto the card 18 at a writing device 20, which records the data indelibly on a first storage first area 23 of the card, as represented by the arrow Y, the first area 23 preferably comprised of an optical recording medium. Writing device 20 has the capability to record personal identification data and various ownerships, entitlements, licenses, permits, insurance coverage, medical records, biometric information, requirements and responsibilities, generally defined in this invention as a set of "entitlements". Writing device 20 may also have the capability to accept payment from card 18 or another card or form of payment such as cash, not shown, in order to pay for some of the above benefits to be recorded on first area 23. Alternatively, data stored on first area 23 by writing device 20 may be input by an operator, and payments for those benefits which require payment may be accepted by the operator.

Besides payments, other conditions may need to be fulfilled before some benefits are written on first area 23. For example, gun permits may require a background check and the expiration of a waiting period, social security payments may require the attainment of a certain age and motor vehicle registrations require the ownership of a motor vehicle. For this reason the first area 23 should have the ability to store additional data at a subsequent time to the initial writing. On the other hand, the data that is written on first area 23 should be indelibly written, as the information stored on that area includes personal identification, medical and benefit records that should not be tampered with. As such, first area 23 preferably houses an optical storage medium which can be written once and read many times, and writing device 20 includes an optical writer such as a laser which marks the optical storage medium in order to record bits of data. A number of writing devices 20 may be located in secure locations such a federal, state and city government buildings. The storage capacity of the optical stripe on area 23 is preferably above one megabyte.

In order to use the entitlements denoted by the data stored on first area 23, the person 15 goes to a data conversion terminal DCT 26, as indicated by the arrow X. DCTs 26 may be located in a number of locations such as shopping malls or supermarkets, office buildings, as well as near writing devices 20. The person also brings the card 18 to the DCT 26, as shown by the arrow V. The DCTs 26 serve several functions. A main function is to download data stored on the first area 23 onto a second area. The second area preferably includes a pair of magnetic storage stripes 29 and 30, which are located on an opposite side of the card from that of first area 23. This downloading can be accomplished by providing a menu at the DCT 26 listing a large number of possible entitlements or categories, subcategories of entitlements and having the person 15 select from that menu a few entitlements to which the person 15 desires to have easy access. Once this data is stored on stripes 29 and 30, it can be read by a wide variety of inexpensive magnetic readers. Another function of DCT 26 is to verify the identity of the person 15 possessing card 18, as input is required from the person 15 to the DCT 26 that must correspond with information stored on first area 23. The information that the person is required to input can be a personal identification code or biometric information such a a fingerprint or voiceprint. Furthermore, knowledge of the entitlements stored on first area 23 can be used as a security device, as repeated selection of entitlements not listed on the first storage area 23 can be grounds for holding the card 18 by the DCT and initiating apprehension measures.

Once the person 15 possessing the card 18 at the DCT 26 demonstrates ownership of the card and selects a number of entitlements desired from the menu of entitlements, data denoting those selected entitlements is stored on stripes 29 and 30 in a form readable by the vast number of magnetic card readers already in existence. The card 18 is then ejected from the DCT 26 as shown by arrow U. The data may allow use of the entitlements selected that is limited in time, in form or in other means as a further security precaution, as this requires that acquisition of additional benefits requires another visit to a DCT 26 and re-verification of the identity of the possessor of the card 18.

The card 18 is taken to a local dispenser 35, as shown by arrow T. Local dispenser 35 can read the data on stripes 29 and 30 and is capable of dispensing an entitlement from the selected set of entitlements denoted by the data on stripes 29 and 30, as shown by arrow S. The dispensers 35 can take a variety of forms depending upon the entitlements involved. For example, the dispensers may range from ATM machines that dispense money, to hand held hunting and fishing license scanners carried by fish and game or park service personnel. The local dispensers 75 can be airline or entertainment event readers that dispense tickets in response to reading ticket entitlements on the stripes 29 and 30. Alternatively, the local dispensers 35 can be scanners held by law enforcement personnel to verify or record a drivers license or vehicle registration number, or food stamp dispensers that read eligibility entitlements from the stripes 29 and 30.

In general, certain entitlements may be desired to be consistently available, such as drivers license information, while other information may be more ephemeral in nature, such as prepaid tickets. As such, it is preferable to have a stripe 29 dedicated to more consistently required entitlements, and another stripe 30 that is used for entitlements that are more variable in nature.

Alternatively, another magnetic storage stripe, not shown, can be disposed adjacent to the optical storage area 23 on a first side of the card for storing more constant entitlements, while more variable entitlements can be stored on stripes 29 and 30 on the second side of the card 18. It is also possible that the second area can have a semiconductor memory instead of a magnetic stripe, which may have a memory of about 8 k Bytes.

Figure 2:
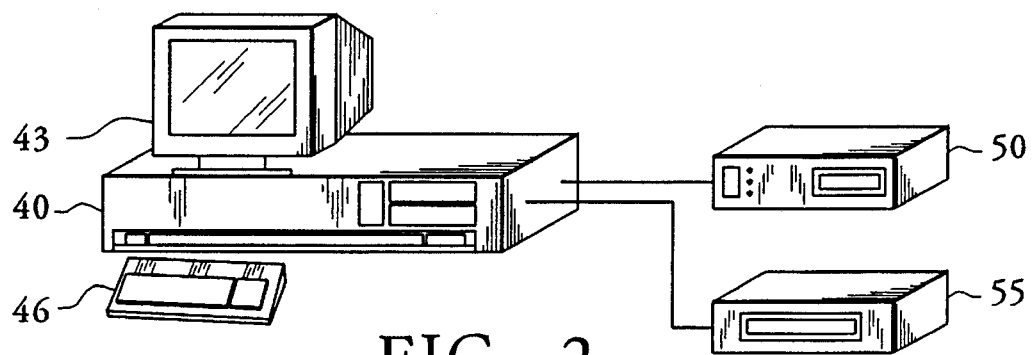
FIG. 2 is a plan view of devices used for acquiring, storing, reading and comparing biometric information of the invention of FIG. 1.

Referring now to FIG. 2, some devices used in the present invention are shown. A personal computer 40 with a video display 43 and keyboard 46 connected is included in the first writing device 20. Also included is an optical card writer 50 which is connected to the computer 40 and used for writing the data denoting a set of entitlements on the first area 23.

A similar computer 40, display 43, and keyboard 46 are used in the DCT 26, but the optical card writer 50 is not included in the DCT 26. Instead, an optical card reader/magnetic card writer 55 is connected to the computer 40 of the DCT 26. The reader/writer 55 reads the entitlements on first area 23 and provides that information, along with personal identification and access data read from that area 23, to the computer 40. The computer 40 compares that information with access data typed into the keyboard 46 to determine whether to allow data authorizing use of the entitlements to be written on the stripes 29 and 30. Provided that the access data allows such writing, a menu of entitlements appears on the video display 43. A set of entitlements is selected from the menu by input through the keyboard or a mouse, not shown. If the selected set is too large to fit on the stripes 29 and 30 that fact will be projected on the display 43, and the selected set limited accordingly. Provided that the selected set of entitlements is a subset of the entitlements read from the area 23, data denoting the selected set will be written on the stripes 29 and 30. If selected sets are repeatedly chosen that are not within the set read from area 23, the card may be held or other security measures instituted. For additional security, stripes 29 and 30 can be initially erased of data upon presentation of the card 18 to the reader/writer 55.

Figure 3:
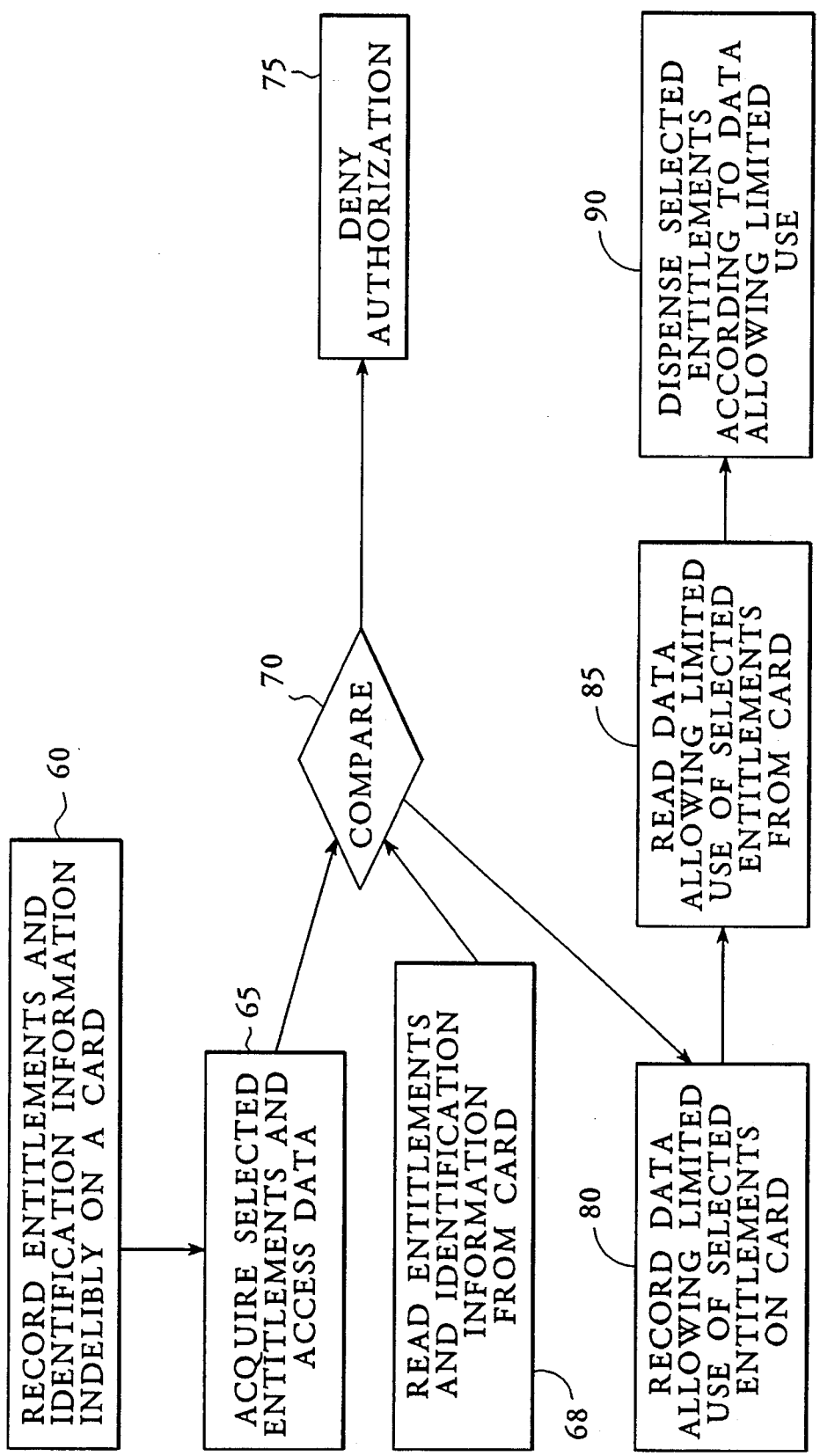
FIG. 3 is a flow chart illustrating use of the system shown in FIG. 1.

Referring to FIG. 3, an overview of the steps involved begins with the card having entitlements and identification information being indelibly recorded 60. Next, access data and selected entitlements are provided 65 by a possessor of the card. The entitlements and identification information that had been recorded on the card are also read 68 at this stage, and compared 70 with the information provided by the card possessor. If the access data does not correspond to the identification information or the selected set of entitlements is not within the set of entitlements read from the card, authorization is denied 75. If the access data does correspond to the identification information and the selected set of entitlements is within the set of entitlements read from the card, data allowing limited use of the selected entitlements is recorded 80 on the card. Thereafter, the limited use of selected entitlements is dispensed 90.

Figure 4A:
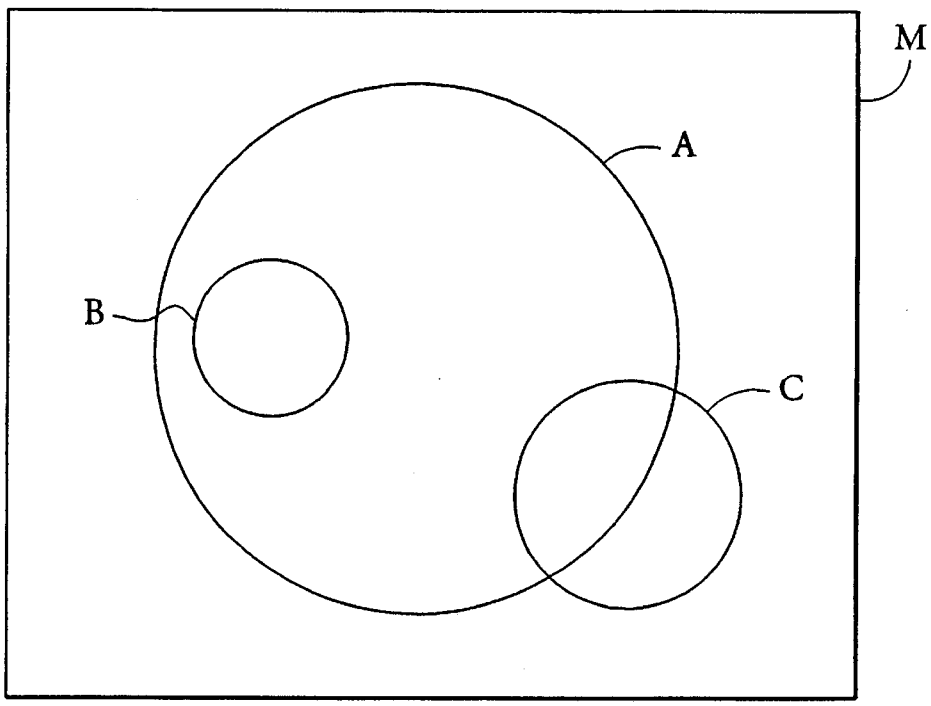
FIGS. 4a and 4b are sets of entitlements of the present invention.
Figure 4B:
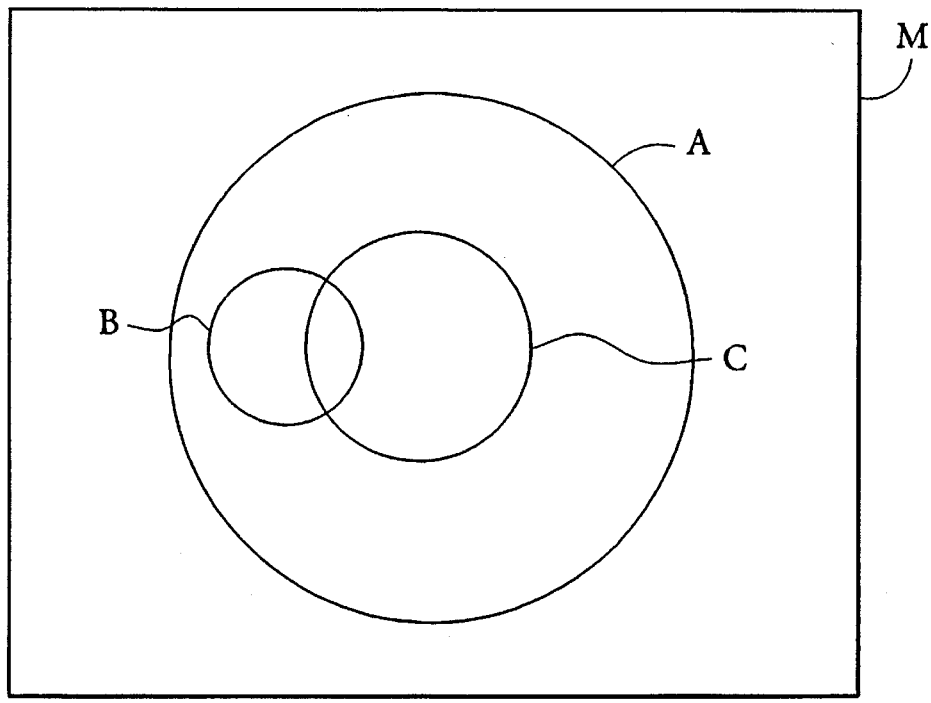

FIGS. 4a and 4b show the relationship of the various sets of entitlements of the present invention. The set A represents the entitlements which have been permanently recorded on the first storage area 23 of the card 18. The entitlements in set A are contained within a universe of entitlements labeled M, and may have been purchased by the owner of card 18, may be privileges available to all regardless of payment, or may be records or information particular to the card owner. M may also represent the menu which is displayed at video display 43 from which a set B is selected by a possessor of the card. Set B can be seen to be a subset of set A, allowing data representing the entitlements of set B to be written on storage areas 29 and 30 for near term use by the possessor of the card. If, however, the set of entitlements selected by the possessor of the card from menu M is not a subset of set A, as depicted by set C in FIG. 4a, the authorization to write data in areas 29 and 30 allowing use of the card to obtain benefits is denied. In FIG. 4b set C as well as set B is a subset of set A and so either could be used to obtain benefits. Set C is depicted partially overlapping set B, as it would be common to select some of the same entitlements and some different entitlements during subsequent visits to a DCT.

I claim:

1. A method of providing benefits comprising, indelibly writing, on a first area of a card, data denoting a first set of entitlements, with said first area of said card being an optical storage medium, reading said first area of said card and acquiring information representing a second set of entitlements from a possessor of said card, if said second set of entitlements is a subset of said first set of entitlements, then writing, on a second area of said card, data authorizing use of said second set of entitlements, said second area of said card being a magnetic recording medium, and reading said second area of said card and providing benefits according to said use of said second set of entitlements.

2. The method of claim 1 further comprising, indelibly writing, on said first area of said card, data denoting personal identification, reading said first area of said card and acquiring access information from said possessor of said card, and if said access information does not correspond to said data denoting personal identification, preventing said writing, on said second area of said card, of said data authorizing use of said second set of entitlements.

3. The method of claim 1 further comprising, erasing preexisting authorization data from said second area of said card, prior to acquiring information representing a second set of entitlements from a possessor of said card.

4. The method of claim 1 wherein said first area of said card has a semiconductor integrated circuit memory and said second area of said card has a magnetic storage medium.

5. The method of claim 1 wherein said first area is on a first side of said card and said second area is on a second side of said card.

6. The method of claim 1 wherein said first area is disposed on a first side of said card and has an optical recording stripe and said second area is disposed on a second side of said card and has a plurality of magnetic recording stripes.

7. The method of claim 1 wherein said first area has an optical recording stripe on a first side of said card, and said second area has a magnetic recording stripe on both said first side and a second side of said card.

8. The method of claim 1 wherein said indelibly writing and said reading are performed at different locations.

9. The method of claim 1 wherein said writing data and said providing benefits are performed at different locations.

10. The method of claim 1 wherein said reading said first area of said card, said acquiring a second set of entitlements from a possessor of said card, and said writing data are performed at a single location.

11. The method of claim 1 wherein said providing benefits is performed at a greater number of locations than said writing data authorizing use of said second set of entitlements.

12. The method of claim 1 wherein said writing data authorizing use of said second set of entitlements is performed at a greater number of locations than said indelibly writing data denoting a first set of entitlements.

13. The method of claim 1 wherein said first area of said card has an optical storage medium and said second area of said card has a semiconductor integrated circuit memory.

14. A method of acquiring benefits comprising, receiving a card having data denoting a first set of entitlements permanently encoded onto an optical recording medium, providing said card to a data conversion terminal and selecting a second set of entitlements, receiving said card from said data conversion terminal with data encoded on a magnetic recording medium of said card authorizing use of said second set of entitlements if said second set is a subset of said first set, providing said card to a benefits dispenser and receiving benefits according to said second set of entitlements.

15. The method of claim 14 further comprising providing personal identification and entitlements information to a writing terminal, prior to receiving said card having data denoting said first set of entitlements permanently encoded.

16. The method of claim 15 further comprising providing to said data conversion terminal a personal access code corresponding to said personal identification information, prior to receiving said card from said data conversion terminal with data encoded on said card authorizing use of said second set of entitlements.

\* \* \* \* \*